United States Patent Office 3,173,444
Patented Mar. 16, 1965

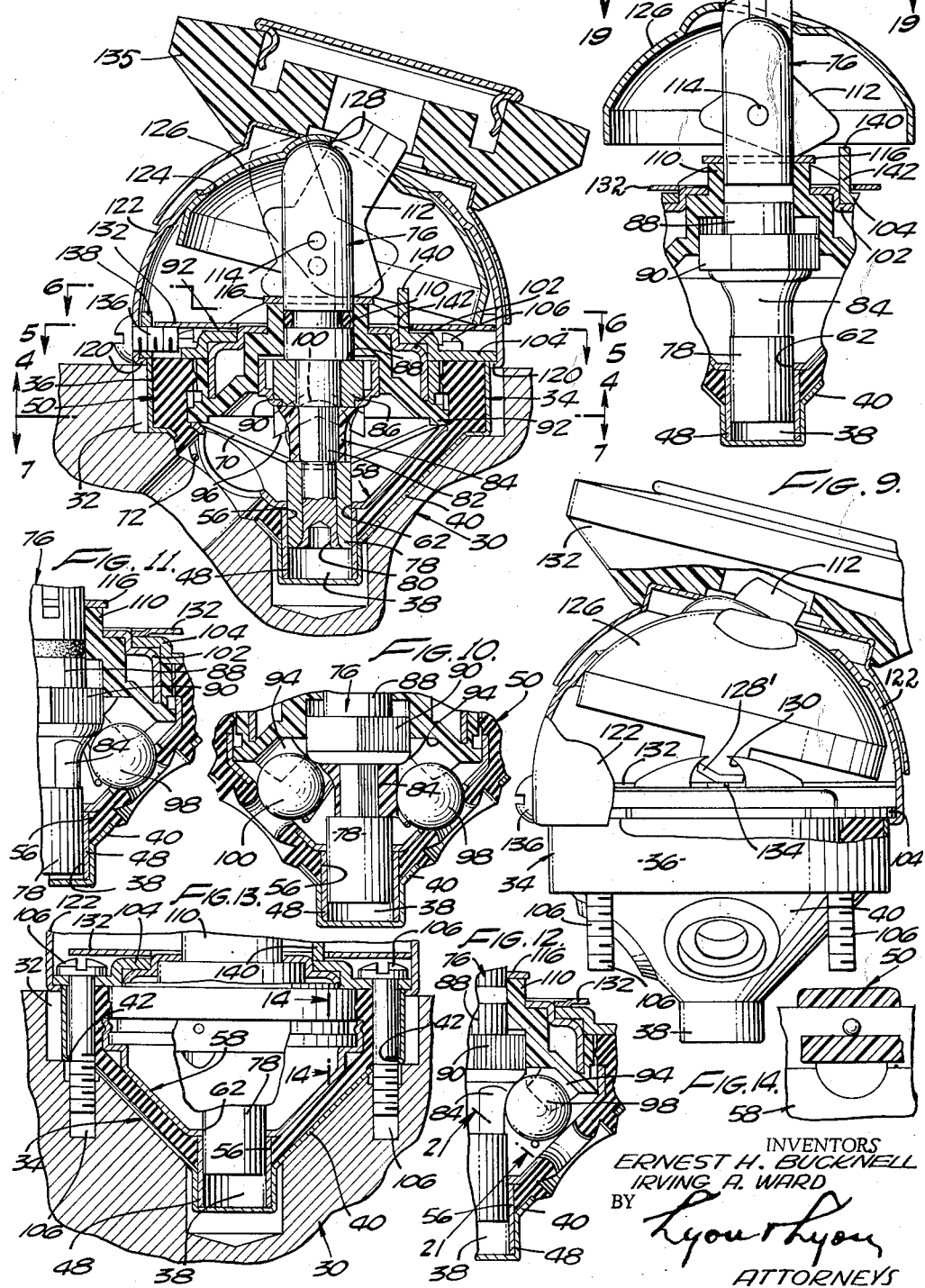

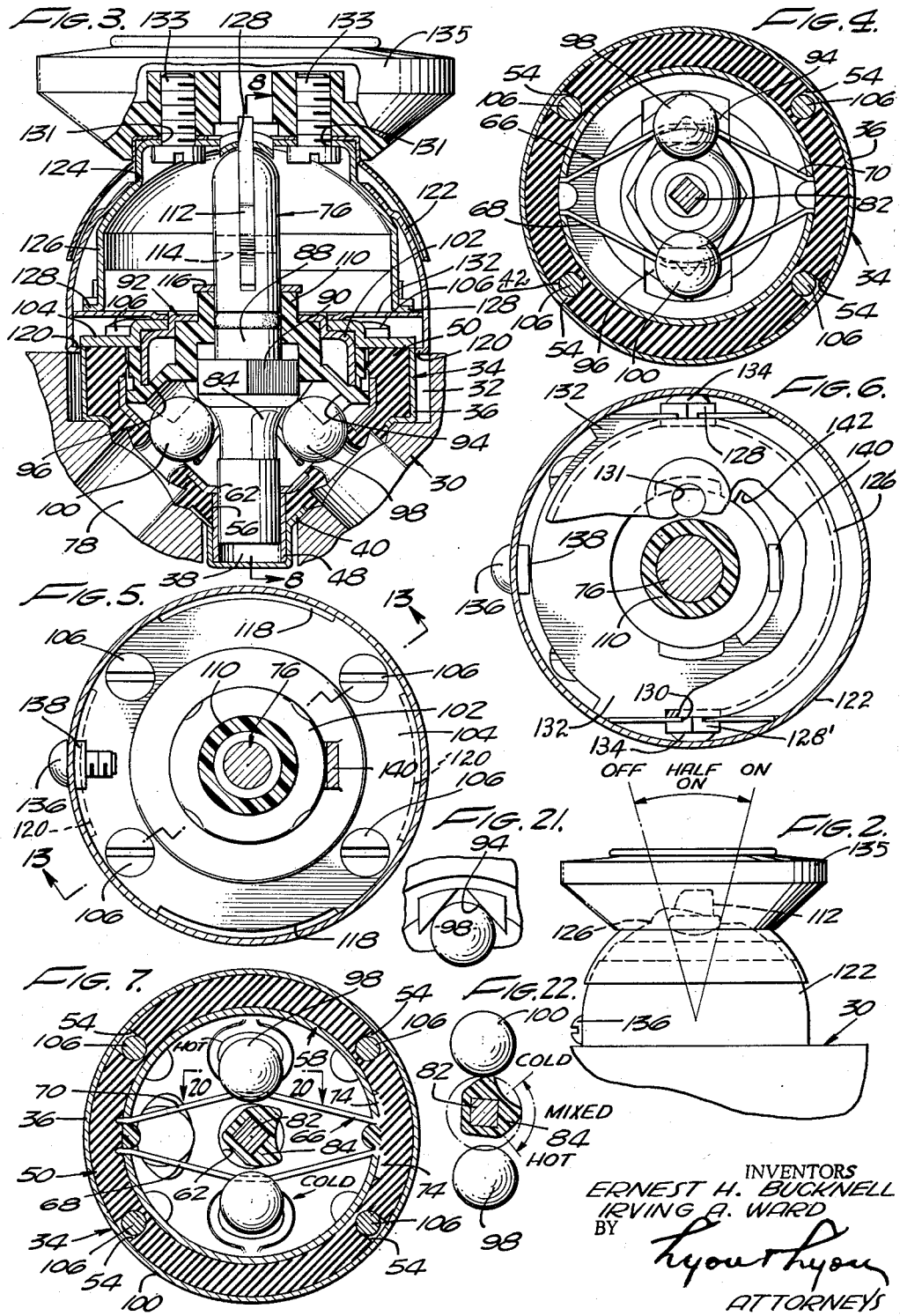

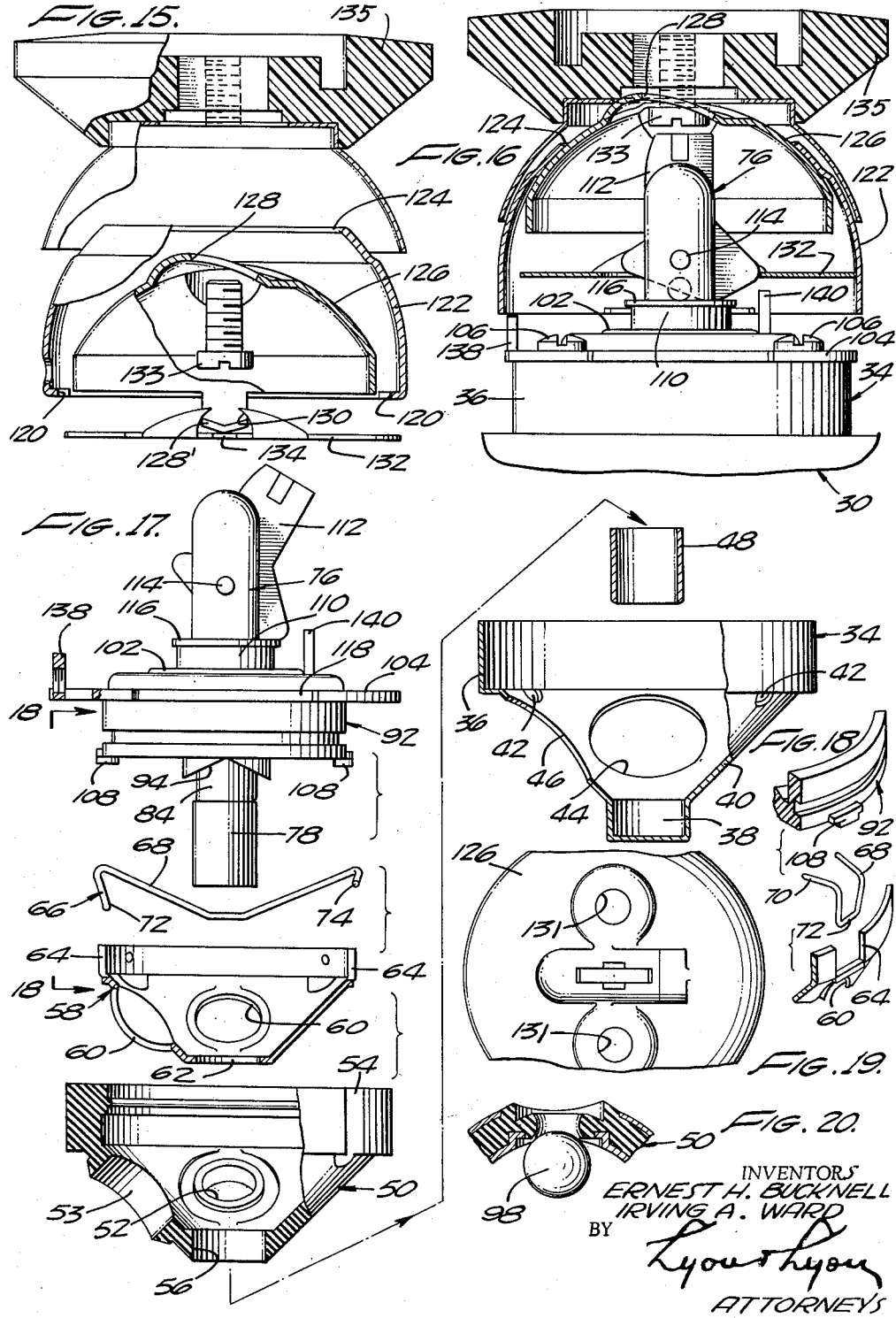

3,173,444
REMOVABLE CARTRIDGE TYPE MIXING VALVE
Ernest H. Bucknell and Irving A. Ward, Los Angeles, Calif., assignors of five percent to estate of Ralph E. Bletcher, deceased, three and one-third percent to James Hamilton Bletcher, trustee, ten percent to Pearl White Bletcher, ten percent to Hazel Skinner Brondum, eight percent to Charlotte Robertson, one percent to Kenneth Robertson, trustee, two and two-thirds percent to Gary B. Robertson, eight percent to James Hamilton Bletcher, two percent to Richard James Bletcher, eight percent to E. H. Bucknell, four and one-half percent to Myron Glauber, trustee, twelve and one-half percent to estate of Mabel Bucknell, deceased, twenty and one-half percent to Marcia B. Liston, and four and one-half percent to Daniel G. Liston, trustee
Filed June 29, 1962, Ser. No. 206,320
6 Claims. (Cl. 137—454.6)

This invention relates to a removable valve.

It is an object of this invention to provide a removable valve wherein all of the components are easily and rapidly assembled for insertion into a mixing chamber in a valve body and which may be easily removed therefrom and disassembled for repair or replacement.

It is still a further object of this invention to provide a novel control means for such a valve.

Still a further object of this invention is to provide a removable valve and control mechanism therefor which may be inserted as a unit into the mixing chamber of a valve body and may be readily assembled and disassembled.

Other objects and advantages will be readily apparent from the following description.

In the drawings:

FIGURE 1 is a side elevation in section of a fully opened valve embodying this invention.

FIGURE 2 is a fragmentary side elevation of the valve with the control at the half open position.

FIGURE 3 is a section similar to FIGURE 1 with the valve half open.

FIGURE 4 is a view taken along line 4—4 of FIGURE 1.

FIGURE 5 is a view taken along line 5—5 of FIGURE 1.

FIGURE 6 is a view taken along line 6—6 of FIGURE 1.

FIGURE 7 is a view taken along line 7—7 of FIGURE 1.

FIGURE 8 is a view taken along line 8—8 of FIGURE 3.

FIGURE 9 is a side elevation with parts broken away illustrating support of the control cage.

FIGURE 10 is a fragmentary side elevation in section illustrating control of water flow through the valve.

FIGURE 11 is a fragmentary side elevation in section further illustrating control of water flow.

FIGURE 12 is a view similar to FIGURE 11 with the valve fully open.

FIGURE 13 is a view taken along line 13—13 of FIGURE 5.

FIGURE 14 is a view taken along line 14—14 of FIGURE 13.

FIGURE 15 is a diagrammatic view with parts broken away of the control mechanism.

FIGURE 16 is a side elevation partially in section of the control mechanism.

FIGURE 17 is a diagrammatic view of the valve components.

FIGURE 18 is a view taken along line 18—18 of FIGURE 17.

FIGURE 19 is a view taken along line 19—19 of FIGURE 8.

FIGURE 20 is a view taken along line 20—20 of FIGURE 7.

FIGURE 21 is a view taken along line 21—21 of FIGURE 12.

FIGURE 22 is a diagrammatic view illustrating mixture control in the valve.

This present invention is an improvement on the device described and claimed in U.S. Patent 2,923,315, issued February 2, 1960 to R. E. Bletcher et al. and the valve mechanism works in substantially the same manner.

A valve body 30 has a mixing chamber 32 (see FIGURES 1, 3 and 13) formed therein having hot and cold water inlets and an outlet to a spout. The present valve and control therefor is adapted to be inserted as a unit into the mixing chamber.

A valve retainer 34 (see FIGURE 18) is formed of suitable material such as metal and has an upper ring 36 and a lower cylindrical well 38 joined by conical wall 40. The wall 40 has a series, in this instance, 4 screw holes 42 and a pair of opposed inlet holes 44 and an outlet hole 46 therein. A tubular member 48 is telescopically received in said well 38.

Positioned above and supported in retainer 34 is a valve seat and packing member 50 formed of a suitable resilient material and having inlet openings 52 corresponding to and aligned with inlet openings 44 in retainer 34 and an outlet hole 53 aligned with outlet hole 46. Also the valve member 50 has 4 notches 54 therein which align with screw holes 42. At the lower extremity of the valve member 50 is an aperture 56 which telescopically receives tubular member 48.

Positioned within the valve member 50 is a support cage 58 formed of brass or other suitable material and having openings such as 60 therein which align with similar openings in valve member 50 and valve retainer 34 and a central aperture 62. The latter aligns with aperture 56 but has a reduced diameter so that cage 58 abuts tubular member 48 and holds same in well 38. At opposed portions the upper extremity of cage 58 is notched as at 64 to receive spring 66. The spring is formed of a pair of side bars 68 and 70 joined at one end 72 which is bent downwardly and the remaining ends are bent downwardly as at 74 to engage cage 58 and support the spring in place.

A valve stem 76 projects through opening 62 in cage 58 and opening 56 in valve member 50 and carries a cylindrical head 78 which is telescopically received in tubular member 48. The head 78 is fit over the extremity of stem 76 which has a recess 80 therein (see FIGURE 1) and is swedged outwardly to lock head 78 in place. Immediately above head 78 the stem has a non-circular segment 82 upon which cam 84 fits which cam will hereinafter be further described.

Positioned on valve stem 76 above the noncircular segment is a bushing 86 which abuts the cam 84 and a shoulder 88 formed on stem 76. A nut 90 which in this embodiment is hexagonal in shape fits over bushing 86. Positioned on nut 90 is a ball retainer 92 which has an inclined underface with a pair of opposed V-shaped ball retaining surfaces 94 and 96 which receive balls 98 and 100 and hold them in the proper relationship with respect to the spring 66 and inlet openings 52 in valve member 50 as will hereinafter be described.

In this embodiment the ball retainer is formed of a suitable plastic material which is reinforced by stiffener 102 which in turn forms a seat for retainer 104. The retainer has screw holes receiving screws 106 which in turn pass through notches 54 and screw holes 42 and screw into suitable holes tapped into valve body 30 to hold the unit in place.

The ball retainer at its lowermost extremity has a pair of indexing tabs 108 which fit into notches 64 in cage 58 to facilitate assembly of the elements.

The upper extremity of ball retainer 92 is a tubular extension 110 providing a bearing for valve stem 76 permitting rotation thereof with respect to the retainer. Above the extension 110 the shaft is bifurcated to receive crank 112 held in place by pin 114. A bearing washer 116 in the form of a metal washer rests on the top of the extension 110.

When thus assembled the balls 98 and 100 are each held against a side bar of spring 66 by the V-shaped ball retaining surfaces 94 and 96 with shaft or valve stem 76 both rotatably and reciprocally movable with respect to valve member 50 to control volume of flow through openings 52 by reciprocation and mixture of hot and cold water by rotation of the cam 94 as described in detail in Patent 2,923,315 identified more fully above, and to which reference is made for further description of the valve action.

The retainer 104 has a pair of peripheral notches 118 which form with inturned flanges 120 on cap 122 a bayonet lock. The cap has an enlarged opening 124 at its uppermost extremity and receives therein a cam cage 126 which is slotted at its uppermost extremity as 128 to receive the end of crank 112 and has a pair of screw holes 131 through which handle 135 is secured by screws 133.

The cam cage 126 at its lower extremity has an opposed pair of downwardly and then outwardly projecting lugs 128'. The outer portion of the lugs is bent to form a V which project through slots 130 (see FIGURES 9 and 15) in upturned flanges on spring plate 132 thereby pivotally mounting cam cage 126 on tabs 134 of plate 132.

A set screw 136 projects through a suitable hole in cap 122 and screws into a suitable screw hole in upturned tab 138 on retainer 104 to hold the device in assembly.

A further upturned lug 140 on retainer 104 fits with a cutaway 142 on spring plate 132 (see FIGURE 6) limiting rotation of the handle 135 and valve stem 76.

In operation the volume of water admitted through inlet holes 52 in valve element 50 and hence discharged through outlet 53 is controlled by reciprocating valve stem 56. This is accomplished by moving handle 135 from the right hand or fully open position of FIGURES 1 and 12 through the half open upright position of FIGURE 3 to the fully closed position to the left in said figures (as seen in FIGURE 11). To vary the mixture of hot water entering one inlet 52 and cold water entering the other inlet 52 the handle 135 is rotated thereby rotating cam 84 and varying the distance of each ball 98 and 100 from its respective seat in its respective opening 52 in valve element 50.

To assemble the structure the spring 66 is placed in the notches in cage 58 which is in turn inserted into the valve element 50 with the inlet and outlet holes aligned. Tubular member 48 is inserted in well 38 and then the case and valve element assembly inserted into valve retainer 34. Valve stem 76 has mounted thereon the various components seen in the upper portion of FIGURE 17 including ball retainer 92 and retainer 104. The balls are then positioned in V grooves 94 and 96 and then the valve stem and specifically head 78 is inserted into member 48 forming a complete cartridge which is then inserted into the valve chamber 32 and secured in place by screws 106. After the valve cartridge has thus been lowered into place and secured the operating mechanism may be applied.

Cam cage 126 is secured to spring plate 132 by inserting lugs 128' in slots 130. This assembly is then positioned within cap 122. Handle 135 is then secured by screws 133 to cam cage 126. The control assembly thus formed is lowered onto the valve stem with the upper portion of crank 112 in slot 128 of the cam cage.

The flanges 120 are aligned with slots 118 and then rotated forming a bayonet lock to retainer 104. The set screw 136 is then screwed into tab 138 to retain the control mechanism in assembled relationship with respect to the valve mechanism.

While what hereinbefore has been described as the preferred embodiment of this invention, it is readily apparent that alterations and modifications can be resorted to without departing from the scope of this invention and such alterations and modifications are intended to be included within the scope of the appended claims.

We claim:

1. A removable valve assembly adapted to be inserted into a valve chamber having a hot water inlet and a cold water inlet and a single outlet comprising a valve retainer having holes therethrough aligned with said inlets and outlet, a resilient valve element insertable into said retainer having openings therethrough aligned with said inlets and outlet, a support cage insertable into said valve element having openings therein aligned with said inlets, spring means positioned within said support cage, a valve stem, a ball retainer rotatably supported on said valve stem, said valve stem being insertable into said support cage, a pair of balls, a pair of V-shaped elements formed on said ball retainer, each holding one of said balls against said spring means and in alignment with one of said inlet openings, cam means on said valve stem whereby rotation thereof varies the opening through said inlets.

2. A removable valve assembly adapted to be inserted into a valve chamber having a hot water inlet and a cold water inlet and a single outlet comprising a valve retainer having holes therethrough aligned with said inlets and outlet, a resilient valve element insertable into said retainer having openings therethrough aligned with said inlets and outlet, a support cage insertable into said valve element having openings therein aligned with said inlets, spring means positioned within said support cage, a valve stem, a ball retainer rotatably supported on said valve stem, said valve stem being insertable into said support cage, a pair of balls, a pair of V-shaped elements formed on said ball retainer, each holding one of said balls against said spring means and in alignment with one of said inlet openings, cam means on said valve stem whereby rotation thereof varies the opening through said inlets, said valve stem above said retainer means having a crank pivotally mounted thereon.

3. A removable valve assembly adapted to be inserted into a valve chamber having a hot water inlet and a cold water inlet and a single outlet comprising a valve retainer having holes therethrough aligned with said inlets and outlet, a resilient valve element insertable into said retainer having openings therethrough aligned with said inlets and outlet, a support cage insertable into said valve element having openings therein aligned with said inlets, spring means positioned within said support cage, a valve stem, a ball retainer rotatably supported on said valve stem, said valve stem being insertable into said support cage, a pair of balls, a pair of V-shaped elements formed on said ball retainer, each holding one of said balls against said spring means and in alignment with one of said inlet openings, cam means on said valve stem whereby rotation thereof varies the opening through said inlets, said valve stem above said retainer means having a crank pivotally mounted thereon, and a bearing washer between said ball retainer and said crank.

4. A removable valve assembly adapted to be inserted into a valve chamber having a hot water inlet and a cold water inlet and a single outlet comprising a valve retainer having holes therethrough aligned with said inlets and outlet, a resilient valve element insertable into said retainer having openings therethrough aligned with said inlets and outlet, a support cage insertable into said valve element having openings therein aligned with said inlets, spring means positioned within said support cage, a valve stem, a ball retainer rotatably supported on said valve stem, said valve stem being insertable into said support cage, a pair of balls, a pair of V-shaped elements formed on said ball retainer, each holding one of said balls against said spring means and in alignment with one of said inlet openings, cam means on said valve stem whereby rotation thereof varies the opening through said inlets; a crank on said valve stem; a cam cage engaging said crank, means pivotally and rotatably mounting said cam cage to said ball retainer, a handle secured to said cam cage whereby pivoting of said handle controls the volume of flow and rotation thereof controls the mixture of flow through said valve assembly.

5. A removable valve assembly adapted to be inserted into a valve chamber having a hot water inlet and a cold water inlet and a single outlet comprising a valve retainer having holes therethrough aligned with said inlets and outlet, a resilient valve element insertable into said retainer having openings therethrough aligned with said inlets and outlet, a support cage insertable into said valve element having openings therein aligned with said inlets, spring means positioned within said support cage, a valve stem, a ball retainer rotatably supported on said valve stem, said valve stem being insertable into said support cage, a pair of balls, a pair of V-shaped elements formed on said ball retainer, each holding one of said balls against said spring means and in alignment with one of said inlet openings, cam means on said valve stem whereby rotation thereof varies the opening through said inlets; a crank on said valve stem; a cam cage slotted to receive the extremity of said crank, a spring plate pivotally mounted upon said cam cage, a cap having an opening therein, means rotatably mounting said spring plate in said cap, a handle secured to said cam cage through the opening of said cap whereby pivoting of said handle controls the volume of flow and rotation thereof controls the mixture of flow through said valve assembly.

6. A removable valve assembly adapted to be inserted into a valve chamber having a hot water inlet and a cold water inlet and a single outlet comprising a valve retainer having holes therethrough aligned with said inlets and outlet, a resilient valve element insertable into said retainer having openings therethrough aligned with said inlets and outlet, a support cage insertable into said valve element having openings therein aligned with said inlets, spring means positioned within said support cage, a valve stem, a ball retainer rotatably supported on said valve stem, said valve stem being insertable into said support cage, a pair of balls, a pair of V-shaped elements formed on said ball retainer, each holding one of said balls against said spring means and in alignment with one of said inlet openings, cam means on said valve stem whereby rotation thereof varies the opening through said inlets; a crank on said valve stem; a cam cage slotted to receive the extremity of said crank, a spring plate pivotally mounted upon said cam cage, a cap having an opening therein, means rotatably mounting said spring plate in said cap, a handle secured to said cam cage through the opening of said cap whereby pivoting of said handle controls the volume of flow and rotation thereof controls the mixture of flow through said valve assembly and means releasably connecting said cap to said retainer means.

References Cited in the file of this patent
UNITED STATES PATENTS

| | | |
|---|---|---|
| 2,856,952 | Stillwagon | Oct. 21, 1958 |
| 2,923,315 | Bletcher | Feb. 2, 1960 |

Disclaimer 3,173,444.—*Ernest H. Bucknell* and *Irving A. Ward*, Los Angeles, Calif. REMOVABLE CARTRIDGE TYPE MIXING VALVE. Patent dated Mar. 16, 1965. Disclaimer filed Feb. 23, 1976, by the assignee, *Pearl White Bletcher*, part interest.

Hereby enters this disclaimer to her entire interest in all claims of said patent.

[*Official Gazette June 1, 1976.*]